G. CAMPOS.
MEANS FOR THE PROTECTION OF ELECTRICAL INSTALLATIONS FROM EXCESS VOLTAGES.
APPLICATION FILED AUG. 19, 1910.

1,034,198.

Patented July 30, 1912.

2 SHEETS—SHEET 1.

Witnesses:

Inventor
Gino Campos
By
James L. Norris, Jr.
Atty

UNITED STATES PATENT OFFICE.

GINO CAMPOS, OF MILAN, ITALY.

MEANS FOR THE PROTECTION OF ELECTRICAL INSTALLATIONS FROM EXCESS VOLTAGES.

1,034,198. Specification of Letters Patent. Patented July 30, 1912.

Application filed August 19, 1910. Serial No. 578,048.

*To all whom it may concern:*

Be it known that I, GINO CAMPOS, electrical engineer, subject of the Emperor of Austria-Hungary, residing at Milan, Italy, have invented certain new and useful Improvements in Means for the Protection of Electrical Installations from Excess Voltages, of which the following is a specification.

The present invention relates to the protection of electrical installations from the excess voltages which arise in the conductors in the form of sudden variations of the electrical condition of the conductors and which likewise may have their origin in alternating or oscillatory currents of high frequency or in electrical waves which speedily propagate themselves along the line or from any other cause either inside or outside the installation including atmospheric discharges or resonances among the various parts of the installation or as a result of normal working or accidental phenomena.

The object of the invention is to prevent the propagation of these excess voltages along the conductors or lines by damping their amplitude by means of one or more devices connected in shunt upon the line and which considerably increase the "equivalent shunt conductance" and consequently the loss of energy for the currents of high frequency that it is desired to damp, without appreciably increasing the shunt conductance and therefore the leakage among the conductors for the normal working currents of the line.

In the description of the invention which follows a line consisting of two conductors is taken by way of example:—it being understood that in the case of lines composed of a number of conductors each pair of them or each one of them and the earth should be separately considered.

The object of the invention is attained by the employment of one or more circuits connected in parallel with the line, each of these circuits comprising capacity, resistance and inductance or only the first two magnitudes, and this in such a manner that "the equivalent conductance" of such circuits is increased together with the frequency of the variable currents resulting from excess voltages, so that the loss of energy and the damping of these excess voltages increase in their passage along the line. The resistances, inductances and capacities can also be substituted by more complicated circuits if the "equivalent" magnitudes corresponding thereto are taken into account. These magnitudes may be variable in correspondence with the frequency or other conditions.

Figure 1:
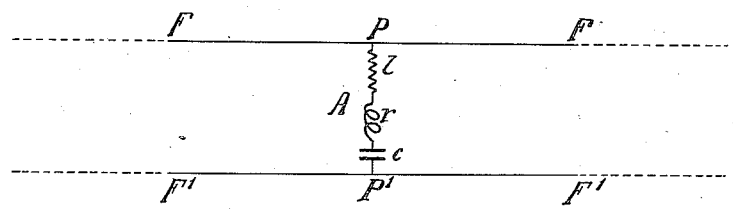

Figure 1 illustrates diagrammatically one of these devices A consisting of an ohmic resistance —$r$—, an inductance —$l$— and a capacity —$c$—, these electrical magnitudes being arranged in series one with the other and in shunt between the points P P' of the line wires F F and F' F'. It should be noted that here (just the contrary of other known devices) with the object of facilitating the loss of energy in the case of high frequencies the value of the ohmic resistance should not be negligible; on the contrary it should purposely be made large in order to increase that loss and to prevent the possibility of a free oscillation of the system which might produce electrical oscillations and consequently resonances or excess voltages in the line. It is therefore desirable that this value of the ohmic resistance (or in general of the equivalent resistance) should not fall below the known minimum value which renders the circuit aperiodic.

Figure 2:
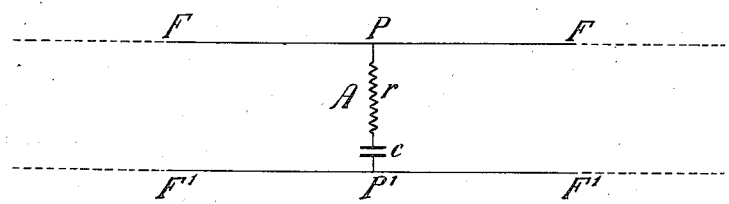
Figure 3:
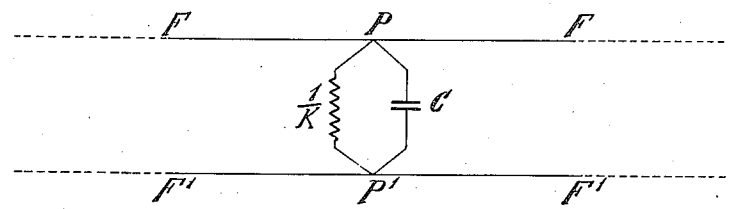

Fig. 2 represents the generally adequate particular case comprising only an ohmic resistance —$r$— connected in series with a capacity —$c$— (that is to say with a negligible inductance —$l$—). In this case the whole of the system A connected in parallel is equivalent to a system composed of two circuits connected one with the other in parallel and branched directly between the same points P P', as shown in Fig. 3; one of these circuits containing only a purely ohmic resistance $$\frac{1}{K'}$$

that is to say having a conductance K, the other comprising only a perfect capacity C with a zero conductance. It is readily demonstratable, however, that the equivalent conductance K and the "equivalent capacity" C of such a system are variable with the frequency $$\frac{\omega}{2\pi}$$

and can be expressed by the following equations:

$$K = \frac{\omega^2 c^2 r^2}{1 + \omega^2 c^2 r^2}$$

$$C = \frac{c}{1 + \omega^2 c^2 r^2}$$

From this it will be noted that with the increase of the frequency, that is to say of $\omega$ the equivalent conductance K increases to the limit value $$\frac{r}{l}$$

and the equivalent capacity C continuously decreases.

For example, for $c = 0.05$ microfarad and $r = 1000$ ohm with $\omega = 2\eta \times 50$.

K is negligible in practice.

C is equal to —$c$— in practice.

For $\omega = 2\pi \times 5000$:

K $= 7.1 \times 10^{-4}$ mhos, that is to say about 71% of the maximum value $\frac{1}{1000}$.

C $= 1.44 \times 10^{-8}$ farad, that is to say 29.6% of —$c$—.

For $\omega = 2\pi \times 50000$:

K $= 9.95 \times 10^{-4}$ mhos, that is to say in practice is equal to the maximum value.

C $= 2.03 \times 10^{-10}$ farad, that is to say 40.6% of —$c$—.

When suitable values for —$r$— and —$c$— are selected in accordance with each particular case, even when the line wires are normally traversed by alternating currents, the result can readily be attained that with the normal working frequencies the parallelly connected device presents only a small capacity and a very low conductance, while with the high frequency of the excess voltages or the sudden variations in the electrical condition of the conductor the value of the equivalent conductance connected in parallel, and consequently of the loss of energy, becomes considerably greater in the passage of the oscillations or electrical variations propagating themselves along the line wires so that they are therefore increasingly damped. As with this arrangement in the case of high frequencies the "equivalent capacity" diminishes simultaneously, the storing of the electro-static energy is reduced, which may otherwise facilitate the propagation of the excess voltages in opposition to the action of the shunt conductance.

In connection with what has been stated above it should be noted that the values of —$r$—$l$—$c$—, even when not equivalent but real, do not represent any absolutely constant magnitudes, as with high frequencies they may vary considerably especially owing to the known phenomenon of superficial flow or "skin effect" and also to the phenomena of dielectric hysteresis and so forth.

Figure 4:
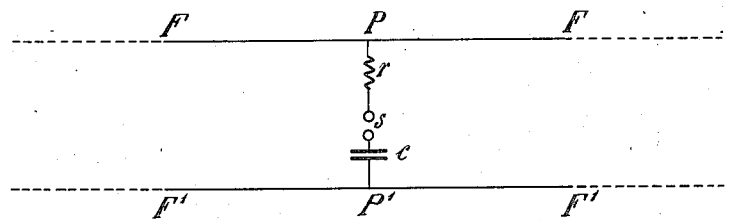

Similar results to those attained in the case explained above can be obtained by suitably selecting the values when the inductance —$l$— presents a not negligible value and also when instead of the simple circuits represented in Figs. 1 and 2 other more complicated circuits are employed; and in some cases instead of an alteration of the values of K and C invariably in the same direction, a zone of maximum effect between given limits of the frequency can be attained. In addition, the ohmic resistance of the circuit A in Figs. 1 and 2 or some or all of the ohmic resistances contained in the more complicated circuits may also comprise the resistance of one or more sparks if the corresponding conductor is supposed to be interrupted and consequently presenting one or more spark gaps. In this case as regards Fig. 1 we arrive at the arrangement illustrated in Fig. 4 where in addition to the ohmic resistance —$r$— a spark gap S is shown. As, however, in the latter case the resistance of the gaps traversed by the sparks is relatively small the above considerations as to the advisability of a resistance, which is not too low, must not be left out of account and if necessary it must be supplemented by the addition of an ohmic resistance which as in Fig. 4 causes a further loss of energy.

As regards the dielectric material of the single condenser or of the plurality of condensers it can advantageously be selected with somewhat high dielectric hysteresis or equivalent losses, as by this means the effect of the loss of energy in the dielectricum (a loss increasing with the frequency) is combined with the loss of energy arising from the joule effect in the resistances and consequently the total loss and therefore the damping of the line currents of high frequency, that it is desired to prevent, is increased.

Figure 5:
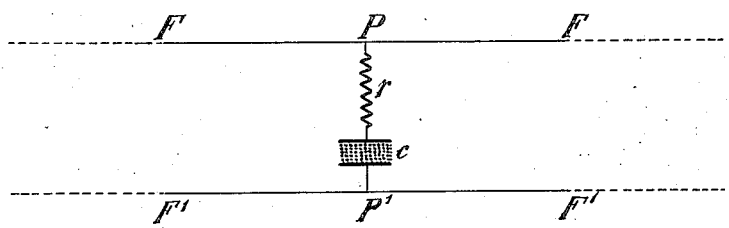

In Fig. 5 the dotted lines represent the dielectricum between the lengths representing the plates of the condensers —$c$— which electricum presents the energy-dissipating properties referred to above; while at the same time an ohmic resistance —$r$— is also shown in series with the condenser.

One or more of the described devices or similar devices can be connected between a single couple of line conductors or between line and earth, whether at the extremities of the line or distributed at convenient intervals along the same.

What I claim and desire to secure by Letters Patent of the United States is:—

1. In means for protecting electrical installations from excess voltages, the combination with line wires, of capacity and resistance appliances introduced in shunt with the line wires as and for the purpose specified.

2. In means for protecting electrical installations from excess voltages, the combination with conducting means, of capacity, resistance and inductance appliances in shunt with the said means as and for the purpose specified.

3. In means for protecting electrical installations from excess voltages, the combination with conducting means, of capacity and resistance appliances in shunt with the said means as and for the purpose specified.

In testimony whereof I affix my signature in presence of two witnesses.

GINO CAMPOS.

Witnesses:
   CHAS. H. FISCHER,
   ENRICO VERVIULLY.